(12) United States Patent
Koppal et al.

(10) Patent No.: US 10,129,623 B2
(45) Date of Patent: Nov. 13, 2018

(54) ELECTRONIC DEVICE HAVING COVERING SUBSTRATE CARRYING ACOUSTIC TRANSDUCER AND RELATED TECHNOLOGY

(71) Applicant: Microsoft Technology Licensing, LLC, Redmond, WA (US)

(72) Inventors: Rohit Krishna Koppal, Sammamish, WA (US); Chandrashekar Gernipalli Subba, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/460,027

(22) Filed: Mar. 15, 2017

(65) Prior Publication Data

US 2018/0270554 A1    Sep. 20, 2018

(51) Int. Cl.
*H04R 1/06* (2006.01)
*H04R 1/32* (2006.01)

(52) U.S. Cl.
CPC .............. *H04R 1/06* (2013.01); *H04R 1/323* (2013.01); *H04R 2499/15* (2013.01)

(58) Field of Classification Search
None
See application file for complete search history.

(56) References Cited

U.S. PATENT DOCUMENTS

| | | | |
|---|---|---|---|
| 7,092,745 B1 * | 8/2006 | D'Souza | H04M 1/0214 379/420.01 |
| 7,317,234 B2 | 1/2008 | Marsh et al. | |
| 7,868,402 B2 | 1/2011 | Huang et al. | |
| 8,406,437 B2 | 3/2013 | Johansen et al. | |
| 8,824,706 B2 | 9/2014 | Stephanou et al. | |
| 8,965,027 B2 | 2/2015 | Bolognia et al. | |
| 9,413,862 B2 | 8/2016 | Tang et al. | |

(Continued)

FOREIGN PATENT DOCUMENTS

| | | |
|---|---|---|
| CN | 2425434 Y | 12/2008 |
| CN | 201167414 Y | 12/2008 |

OTHER PUBLICATIONS

Sell et al, "Printed Embedded Transducers: Capactive Touch Sensors Integrated Into the Organic Coating of Metalic Substrates." pp. 1-8. Oct. 1, 2016.*

(Continued)

*Primary Examiner* — Curtis Kuntz
*Assistant Examiner* — Qin Zhu

(57) ABSTRACT

An electronic device in accordance with a particular embodiment of the present technology includes a rigid covering substrate, an acoustic port extending through the covering substrate, an acoustic transducer carried by the covering substrate, and another electronic component (e.g., a touch sensor or an antenna) also carried by the covering substrate. The electronic device can also include processing circuitry and an array of electrodes through which the acoustic transducer and the other electronic component are electrically connected to the processing circuitry. The array of electrodes can be part of a flexible circuit board extending between a contact region of the covering substrate and the processing circuitry. The transducer lead can extend between a region of the covering substrate including the acoustic port and the contact region.

20 Claims, 4 Drawing Sheets

(56) References Cited

U.S. PATENT DOCUMENTS

| | | |
|---|---|---|
| 2004/0114753 A1 | 6/2004 | Wang et al. |
| 2005/0134574 A1* | 6/2005 | Hill .................. G06F 3/041 345/173 |
| 2005/0146510 A1 | 7/2005 | Ostergard |
| 2007/0188054 A1* | 8/2007 | Hasken ............... B81B 7/007 310/348 |
| 2008/0037769 A1* | 2/2008 | Emmert ............... H04M 1/026 379/433.01 |
| 2008/0175425 A1 | 7/2008 | Roberts et al. |
| 2009/0052715 A1 | 2/2009 | Zhang et al. |
| 2009/0245564 A1 | 10/2009 | Mittleman et al. |
| 2013/0094126 A1* | 4/2013 | Rappoport ............ G02B 27/01 361/679.01 |
| 2013/0108082 A1 | 5/2013 | Dave et al. |
| 2013/0287218 A1 | 10/2013 | Alderson et al. |
| 2014/0064542 A1* | 3/2014 | Bright .................. H04R 1/086 381/359 |
| 2014/0140021 A1* | 5/2014 | Malek .................. H05K 1/118 361/751 |
| 2014/0140533 A1* | 5/2014 | Malek .................. H04R 1/086 381/91 |
| 2015/0082900 A1* | 3/2015 | Fuji ..................... G01L 9/007 73/779 |
| 2015/0181321 A1 | 6/2015 | Niittyinpera et al. |
| 2015/0226585 A1 | 8/2015 | Yang |
| 2015/0245119 A1 | 8/2015 | Lin et al. |
| 2016/0034057 A1* | 2/2016 | Ikeda ................... H04M 1/03 345/173 |
| 2016/0139702 A1* | 5/2016 | Franklin ............... G06F 3/044 345/174 |
| 2017/0010740 A1* | 1/2017 | Chuang ............... G06F 3/0416 |
| 2017/0235434 A1* | 8/2017 | Qutub .................. B06B 1/0292 345/177 |

OTHER PUBLICATIONS

"The key point of soldering and assembling the microphone," http://web.archive.org/web/20071118103532/http:/www.buzzer-speakercom/faq/microphone%20assembly.htm, Published on: Nov. 18, 2007, 1 page.

"International Search Report and Written Opinion Issued in PCT Application No. PCT/US2018/021426", dated May 16, 2018, 10 pages.

* cited by examiner

ELECTRONIC DEVICE HAVING COVERING SUBSTRATE CARRYING ACOUSTIC TRANSDUCER AND RELATED TECHNOLOGY

BACKGROUND

Many modern tablet computers, notebook computers, smart phones, and similar electronic devices include one or more acoustic transducers. For example, a given one of these electronic devices may include a microphone configured to receive sound from a user and a speaker configured to transmit sound to the user. These acoustic transducers are typically positioned inside a solid enclosure that protects the acoustic transducers and other delicate electronic components of the device from the environment. Sound, however, tends to diminish in intensity and fidelity when forced to travel through a solid material. To address this problem, an electronic device may include an acoustic port configured to facilitate sound transmission between air outside the electronic device and an acoustic transducer inside the electronic device. In a particular example, an internal acoustic transducer carried by a dedicated flexible circuit board is positioned near an acoustic port in a covering substrate. The flexible circuit board extends between internal processing circuitry of the electronic device and the area near the acoustic port. A ring of foam or an annular boot is disposed between the acoustic transducer and the covering substrate to seal an acoustic path extending to the acoustic transducer via the acoustic port.

BRIEF DESCRIPTION OF THE DRAWINGS

Many aspects of the present technology can be better understood with reference to the following drawings. The components in the drawings are not necessarily to scale. Instead, emphasis is placed on illustrating clearly the principles of the present technology. For ease of reference, throughout this disclosure the same reference numbers may be used to identify identical, similar, or analogous components or features of more than one embodiment of the present technology.

DETAILED DESCRIPTION

Figure 1:
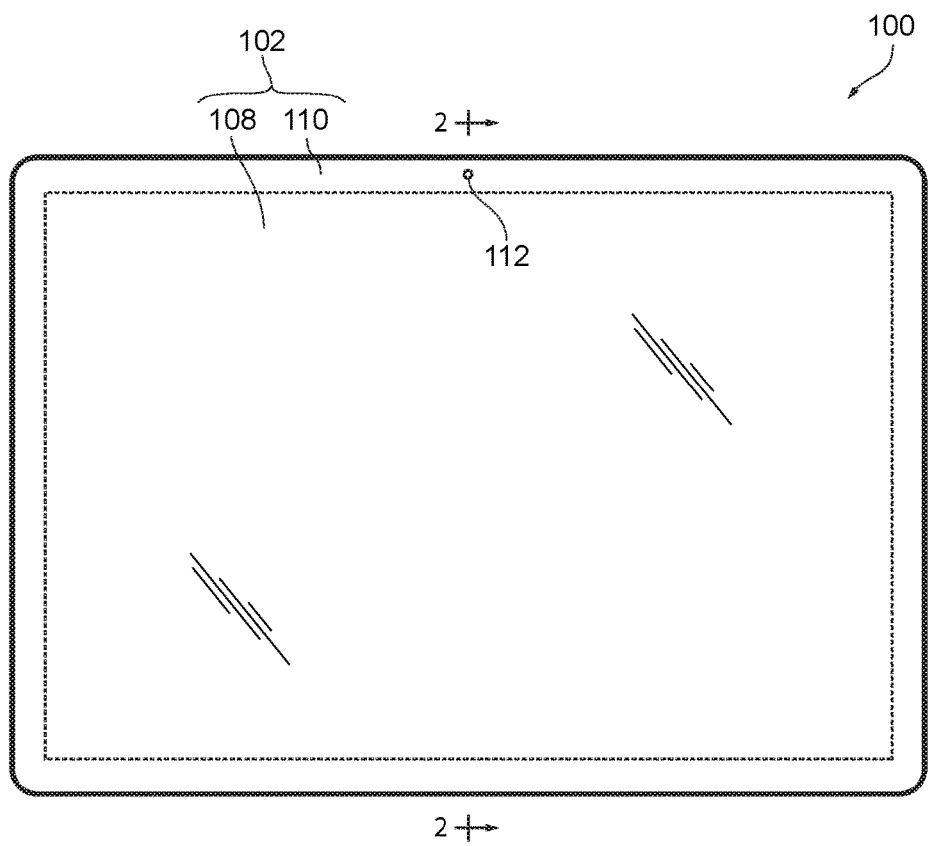
FIG. 1 is a top plan view of an electronic device in accordance with at least one embodiment of the present technology.

The inventors have recognized that conventional approaches to incorporating acoustic transducers into electronic devices have significant disadvantages. One disadvantage is that these conventional approaches often require precise part tolerances and assembly tolerances. When these tolerances are not achieved, gaps may be present around associated acoustic paths, leading to acoustic leakage and to decreased acoustic performance. In addition or alternatively, conventional approaches to connecting an acoustic transducer to a covering substrate may involve forcefully pressing a coupling component (e.g., a resilient boot) against the underside of a covering substrate to activate a pressure-sensitive adhesive between the coupling component and the covering substrate. This can be detrimental to the appearance or operation of the electronic device. For example, when the covering substrate is part of a display, pressure from the coupling process may cause a region of the display to appear bulged, wavy, discolored, or otherwise distorted.

Electronic devices in accordance with embodiments of the present technology at least partially address one or more of the foregoing and/or other problems associated with conventional technologies. For example, an electronic device in accordance with at least some embodiments includes an acoustic transducer carried by a covering substrate rather than coupled to the covering substrate via foam or a resilient boot. In some embodiments, a transducer lead also carried by the covering substrate extends between the acoustic transducer and a flexible circuit board that operably connects the acoustic transducer to processing circuitry inside the electronic device. In some embodiments, the flexible circuit board also operably connects one or more other components of the electronic device to this processing circuitry. Thus, the need for a separate dedicated circuit board to carry the acoustic transducer and to connect the acoustic transducer to the processing circuitry can be reduced or eliminated. This may simplify construction of an electronic device and reduce the likelihood of acoustic leakage during operation of the electronic device. Furthermore, the connection between the acoustic transducer and the covering substrate may be a rigid electrical connection that has little or no detrimental effect on the appearance or operation of the electronic device. In some embodiments, the disclosed technology provides other advantages over conventional counterparts in addition to or instead of the foregoing advantages.

Specific details of electronic devices and related devices, systems, and methods in accordance with several embodiments of the present technology are described herein with reference to FIGS. 1-8. Although features of the present technology may be disclosed herein primarily or entirely in the context of incorporating acoustic transducers into electronic devices, contexts in addition to those disclosed herein are within the scope of the present technology. For example, suitable features of the present technology can apply to incorporating other types of electronic components into electronic devices. Similar to acoustic transducers, electronic components of these other types can be configured to operate in conjunction with special ports (e.g., acoustically transparent ports, optically transparent ports, etc.) extending through covering substrates. Examples of electronic components of these other types include barometers, pressure sensors, light sensors and transmitters (e.g., ultraviolet light sensors and transmitters, infrared light sensors and transmitters, visible light sensors and transmitters, etc.), fingerprint sensors, hall effect sensors, and humidity sensors, among others. Furthermore, it should understood, in general, that other devices, systems, and methods in addition to those disclosed herein are within the scope of the present technology. For example, devices, systems, and methods in accordance with embodiments of the present technology can have different and/or additional configurations, components, and procedures than those disclosed herein. Moreover, a person of ordinary skill in the art will understand that devices, systems, and methods in accordance with embodiments of the present technology can be without one or more of the configurations, components, and/or procedures disclosed herein without deviating from the present technology.

Figure 2:
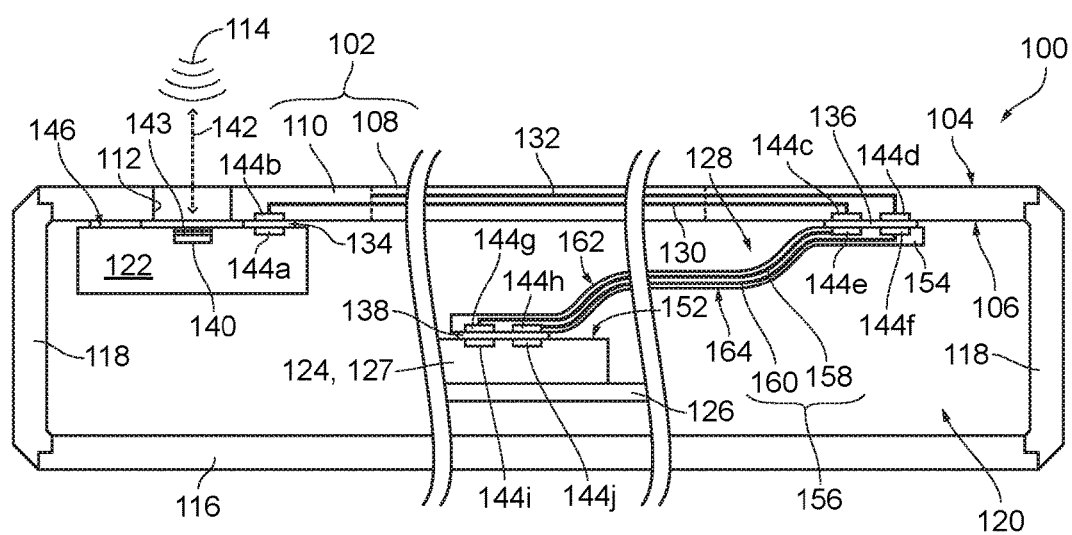
FIG. 2 is a cross-sectional view of the electronic device of FIG. 1 taken along the line 2-2 in FIG. 1.

FIG. 1 is a top plan view of an electronic device 100 in accordance with at least one embodiment of the present technology. FIG. 2 is a cross-sectional view of the electronic device 100 taken along the line 2-2 in FIG. 1. With reference to FIGS. 1 and 2 together, the electronic device 100 can include a first covering substrate 102 having an outer major surface 104, an opposite inner major surface 106, a central portion 108, and a peripheral portion 110 extending around the central portion 108. The first covering substrate 102 can be a rigid plate of glass, transparent plastic, or another suitable material for protecting internal components of the electronic device 100 and serving as a user interface. In at least some cases, the electronic device 100 is configured to display images to a user and to receive touch input from the user via the central portion 108 of the first covering substrate 102. At the peripheral portion 110 of the first covering substrate 102, the electronic device 100 can include a first acoustic port 112 through which the electronic device 100 is configured to receive and/or to transmit sound 114. As shown in FIG. 2, the first acoustic port 112 can extend through the first covering substrate 102 between the outer and inner major surfaces 104, 106. In at least the illustrated embodiment, the first acoustic port 112 is a cylindrical bore. In other embodiments, a counterpart of the first acoustic port 112 can be a slot or a cluster of pinholes or have another suitable form.

With reference again to FIG. 2, the electronic device 100 can further include a second covering substrate 116 parallel to and spaced apart from the first covering substrate 102. The electronic device 100 can also include sidewalls 118 (two shown in FIG. 2) extending between a perimeter of the first covering substrate 102 and a perimeter of the second covering substrate 116. Together, the first and second covering substrates 102, 116 and the sidewalls 118 can define an interior region 120 of the electronic device 100. Within the interior region 120, the electronic device 100 can include an acoustic transducer 122, processing circuitry 124 operably associated with the acoustic transducer 122, and a first circuit board 126 carrying the processing circuitry 124. The acoustic transducer 122 can be a microphone, a speaker, or another electronic component configured to convert the sound 114 into an electrical signal and/or to convert an electrical signal into the sound 114. In the illustrated embodiment, the acoustic transducer 122 is front-facing. In other embodiments, a counterpart of the acoustic transducer 122 can be edge-facing or rear-facing. Examples of suitable microphones include parts AKU142, AKU143, AKU151, AKU340, AKU342, AKU350, AKU240, AKU241, AKU242, AKU243, AKU440, AKU441, AKU442, AKU443, AKU450, AKU450P, and AKU451 from Akustica, Inc. (Pittsburgh Pa.). The processing circuitry 124 can include a packaged integrated circuit 127, one or more other packaged integrated circuits (not shown), and other associated electronic components configured to receive and to process an electrical signal from the acoustic transducer 122 and/or to process and to transmit an electrical signal to the acoustic transducer 122.

The first circuit board 126 carrying the processing circuitry 124 can be spaced apart from the first covering substrate 102. Also within the interior region 120, the electronic device 100 can include a second circuit board 128 extending between the first covering substrate 102 and the processing circuitry 124. In at least some cases, the second circuit board 128 is more flexible than the first circuit board 126. For example, the second circuit board 128 can be substantially flexible and the first circuit board 126 can be substantially rigid. The relative flexibility of the second circuit board 128 can be useful to facilitate forming an electrical connection between the first covering substrate 102 and the processing circuitry 124 without requiring that the processing circuitry 124 be precisely positioned within the interior region 120 of the electronic device 100.

The electronic device 100 can also include a transducer lead 130 and a touch sensor 132 carried by the first covering substrate 102. For example, the transducer lead 130 and the touch sensor 132 can be embedded within the first covering substrate 102 (as shown) or extend along the outer or inner major surfaces 104, 106 of the first covering substrate 102. Furthermore, the transducer lead 130 and the touch sensor 132 can extend along the same or different respective planes parallel to the outer and inner major surfaces 104, 106 of the first covering substrate 102. When the first covering substrate 102 is optically transparent, the transducer lead 130 and the touch sensor 132 can be made of transparent conductive material (e.g., indium tin oxide). Alternatively, the transducer lead 130 and the touch sensor 132 can be made of opaque conductive material (e.g., copper) and can have line widths sufficiently thin to have little or no impact on the optical transparency of the first covering substrate 102. As shown in FIG. 2, the electronic device 100 can include a first conductive coupler 134 through which the acoustic transducer 122 is electrically connected to the transducer lead 130, a second conductive coupler 136 through which the transducer lead 130 and the touch sensor 132 are electrically connected to the second circuit board 128, and a third conductive coupler 138 through which the second circuit board 128 is electrically connected to the processing circuitry 124. The first, second, and third conductive couplers 134, 136, 138 can include an anisotropic conductive adhesive (e.g., an anisotropic conductive paste or an anisotropic conductive film), solder, or another material well suited for providing both adhesion and electrical connection.

The first covering substrate 102 can carry the acoustic transducer 122, with the acoustic transducer 122 being rigidly secured to the inner major surface 106 of the first covering substrate 102 via the first conductive coupler 134. The acoustic transducer 122 can include a second acoustic port 140 aligned with the first acoustic port 112. For example, the sound 114 can travel along a straight acoustic path 142 that extends between an exterior of the electronic device 100 and the second acoustic port 140 via the first acoustic port 112. The acoustic path 142 can be open-air or otherwise configured to contain air or another medium through which the sound 114 travels with less attenuation or distortion than would be caused by traveling through the solid material of the first covering substrate 102. For example, the second acoustic port 140 may contain an acoustically transparent cover 143 that protects internal portions of the acoustic transducer 122 from dust and moisture while having little or no effect on transmission of the sound 114 along the acoustic path 142. The acoustically transparent cover 143 can include fabric, mesh, perforated plastic, or another suitable material integrated into the transducer 122. In some cases, the first conductive coupler 134 extends around the acoustic path 142 in a plane parallel to the outer and inner major surfaces 104, 106 of the first covering substrate 102. In other cases (e.g., as discussed below with reference to FIG. 6), counterparts of the first conductive coupler 134 and the acoustic path 142 can be arranged in another suitable manner.

With reference again to FIG. 2, the electronic device 100 can include contacts 144 (individually identified as contacts 144a-144j) through which the acoustic transducer 122, the transducer lead 130, the touch sensor 132, the second circuit board 128, and the processing circuitry 124 are electrically connected to one another. The contact 144a can be at an upper surface 146 of the acoustic transducer 122, the contacts 144b-144d can be at the inner major surface 106 of the first covering substrate 102, the contacts 144e, 144f can be at an end portion of the second circuit board 128, the contacts 144g, 144h can be at an opposite end portion of the second circuit board 128, and the contacts 144i, 144j can be at an upper surface 152 of the packaged integrated circuit 127. The contacts 144 can be conductive pads, bumps, or other structures well suited for electrical connection to anisotropic conductive adhesive or solder. Although relatively few of the contacts 144 are shown in FIG. 2 for simplicity of illustration, it should be understood that the electronic device 100 can include many more of the contacts 144. For example, any one of the contacts 144a-144j can correspond to an array of independent contacts. Similarly, although transducer lead 130 and the touch sensor 132 are shown as single conductive lines in FIG. 2, it should be understood that these components can include multiple conductive lines. For example, the touch sensor 132 can include a grid of conductive lines extending throughout the central portion 108 of the first covering substrate 102 in a plane parallel to the outer and inner major surfaces 104, 106 of the first covering substrate 102.

As components of the second circuit board 128, the electronic device 100 can include an interconnect substrate 154 and an array of electrodes 156 carried by the interconnect substrate 154. In addition to or instead of being carried by the same circuit board, individual electrodes within the array of electrodes 156 can be associated with one another by sharing one or more connectors, by sharing a location within the electronic device 100, and/or by following a common path within the electronic device 100. As discussed above, the second circuit board 128 can be flexible. Accordingly, the interconnect substrate 154 and the array of electrodes 156 can also be flexible. For example, the interconnect substrate 154 can be a flexible plastic film in which the array of electrodes 156 is embedded or on which the array of electrodes 156 is deposited (e.g., plated). The array of electrodes 156 can include a first electrode 158 extending between the contacts 144e, 144g, and a second electrode 160 extending between the contacts 144f, 144h. As with the transducer lead 130 and the touch sensor 132, although the first and second electrodes 158, 160 are shown as single conductive lines in FIG. 2, it should be understood that these components can include multiple conductive lines, such as multiple conductive lines extending between individual contacts within arrays of contacts corresponding to the contacts 144e-144h. The first and second electrodes 158, 160 can extend along the same or different respective planes parallel to a first major surface 162 and an opposite second major surface 164 of the second circuit board 128.

The acoustic transducer 122 can be electrically connected to the processing circuitry 124 via the transducer lead 130 and the first electrode 158. The touch sensor 132 can be electrically connected to the processing circuitry 124 via the second electrode 160. Thus, through these electrical connections, the acoustic transducer 122 and the touch sensor 132 can be operably associated with the processing circuitry 124 using a single circuit board rather than multiple circuit boards. The transducer lead 130 can facilitate this efficient arrangement by moving an electrical interconnect for the acoustic transducer 122 from a region of the first covering substrate 102 near the first acoustic port 112 to a contact region of the first covering substrate 102 near an electrical interconnect for the touch sensor 132. Accordingly, the need for a separate circuit board extending between the acoustic transducer 122 and the processing circuitry 124 is reduced or eliminated, thereby reducing the part count of the electronic device 100, facilitating assembly of the electronic device 100, improving the performance of the electronic device 100, increasing the reliability of the electronic device 100, reducing the volume of the electronic device 100, allowing more or larger other components to be incorporated into the electronic device 100, etc. Other advantages in addition to or instead of these advantages are also possible.

Figure 3:
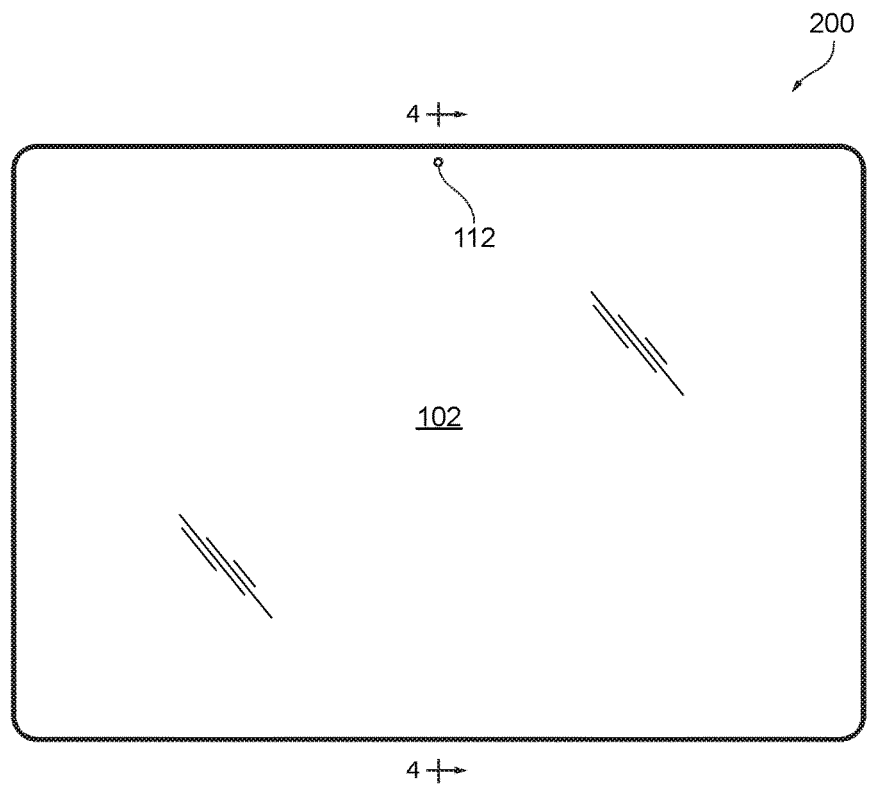
FIG. 3 is a top plan view of an electronic device in accordance with at least another embodiment of the present technology.
Figure 4:
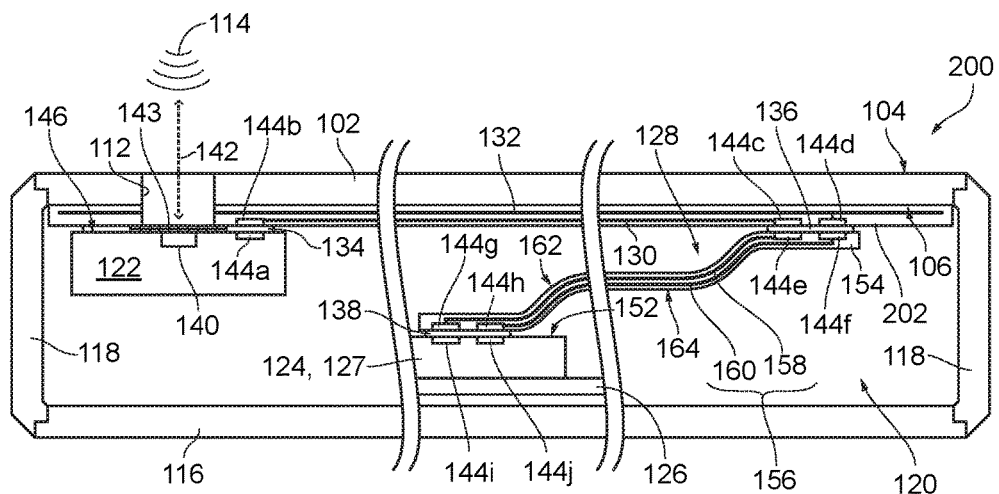
FIG. 4 is a cross-sectional view of the electronic device of FIG. 3 taken along the line 4-4 in FIG. 3.

FIG. 3 is a top plan view of an electronic device 200 in accordance with at least another embodiment of the present technology. FIG. 4 is a cross-sectional view of the electronic device 200 taken along the line 4-4 in FIG. 3. With reference to FIGS. 3 and 4 together, the electronic device 200 can include a film 202 extending along the inner major surface 106 of the first covering substrate 102. The transducer lead 130 and the touch sensor 132 can be embedded within the film 202 rather than being embedded within the first covering substrate 102. Thus, the film 202 can be part of an applied, rather than integrated, touch display module. The film 202 can extend throughout the inner major surface 106 of the first covering substrate 102 such that the electronic device 200 provides an edge-to-edge display via the first covering substrate 102. Thus, the first acoustic port 112 can extend through the first covering substrate 102 and through the film 202. The acoustically transparent cover 143 and the first conductive coupler 134 can be disposed between the transducer 122 and the film 202. For example, the first conductive coupler 134 can extend around the first acoustic port 112 and around the acoustically transparent cover 143 between the transducer 122 and the film 202. In this arrangement, the appearance of a portion of the display around the first acoustic port 112 may be susceptible to distortion from pressure exerted by underlying structures. The acoustic transducer 122 and the first conductive coupler 134, however, may exert little or no such pressure.

Figure 5:
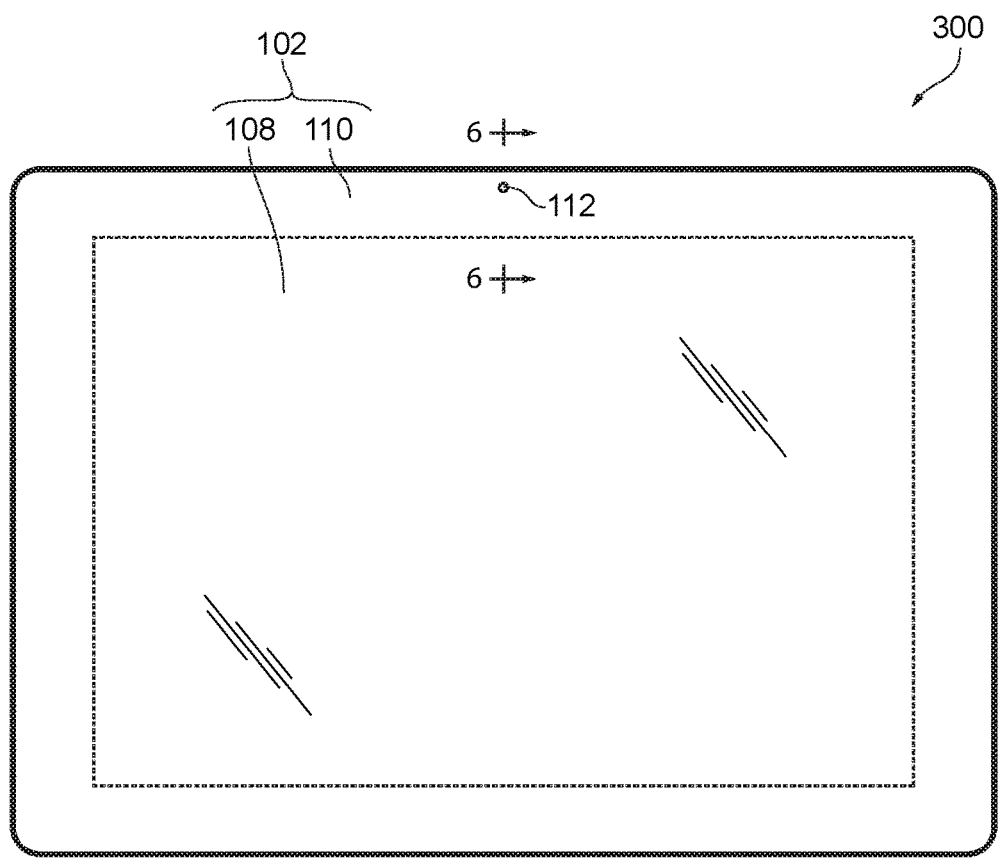
FIG. 5 is a top plan view of an electronic device in accordance with at least another embodiment of the present technology.
Figure 6:
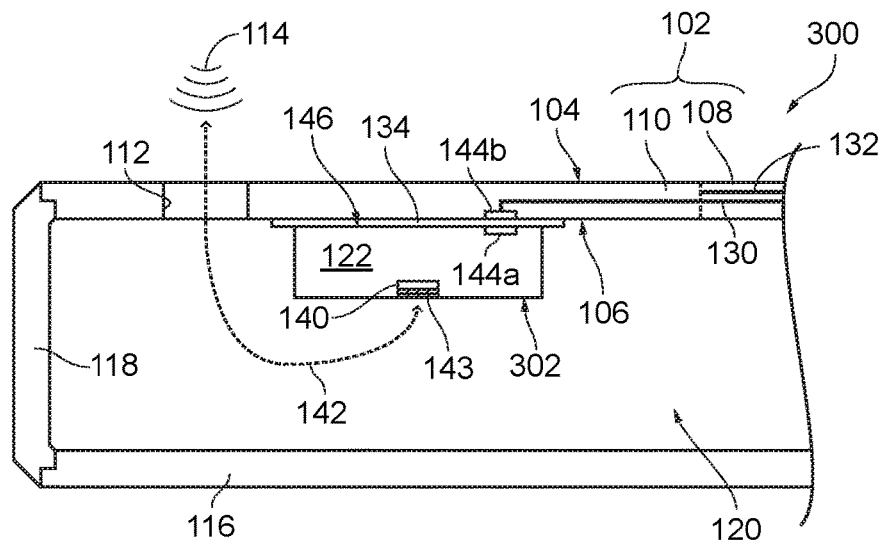
FIG. 6 is a cross-sectional view of the electronic device of FIG. 5 taken along the line 6-6 in FIG. 5.

FIG. 5 is a top plan view of an electronic device 300 in accordance with at least another embodiment of the present technology. FIG. 6 is a cross-sectional view of the electronic device 200 taken along the line 6-6 in FIG. 5. With reference to FIGS. 5 and 6 together, the second acoustic port 140 of the acoustic transducer 122 of the electronic device 300 can be laterally offset from the first acoustic port 112 in a plane parallel to the outer and inner major surfaces 104, 106 of the first covering substrate 102. Furthermore, the second acoustic port 140 can be at a lower surface 302 of the acoustic transducer 122. The first conductive coupler 134 can extend throughout a continuous, non-annular region of a plane between the upper surface 152 of the acoustic transducer 122 and the first covering substrate 102. Thus, rather than being straight and extending to the second acoustic port 140 through the first conductive coupler 134, the acoustic path 142 can be curved and extend to the second acoustic port 140 through a portion of the interior region 120 beside the first conductive coupler 134 and beside the acoustic transducer 122.

Figure 7:
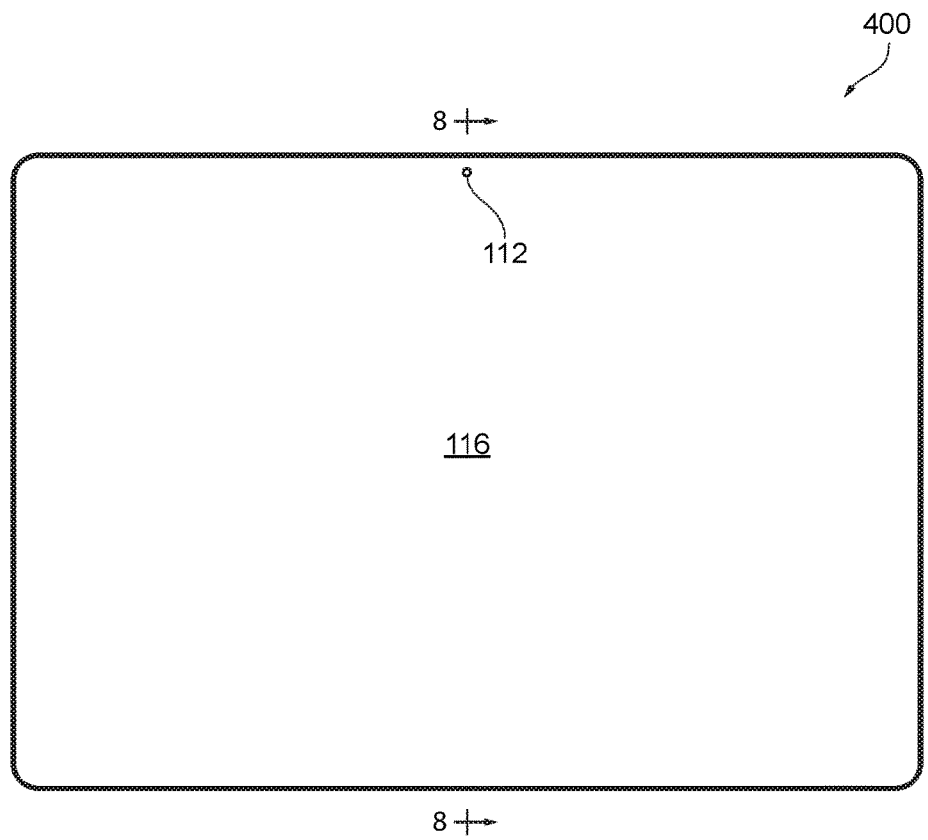
FIG. 7 is a bottom plan view of an electronic device in accordance with at least another embodiment of the present technology.
Figure 8:
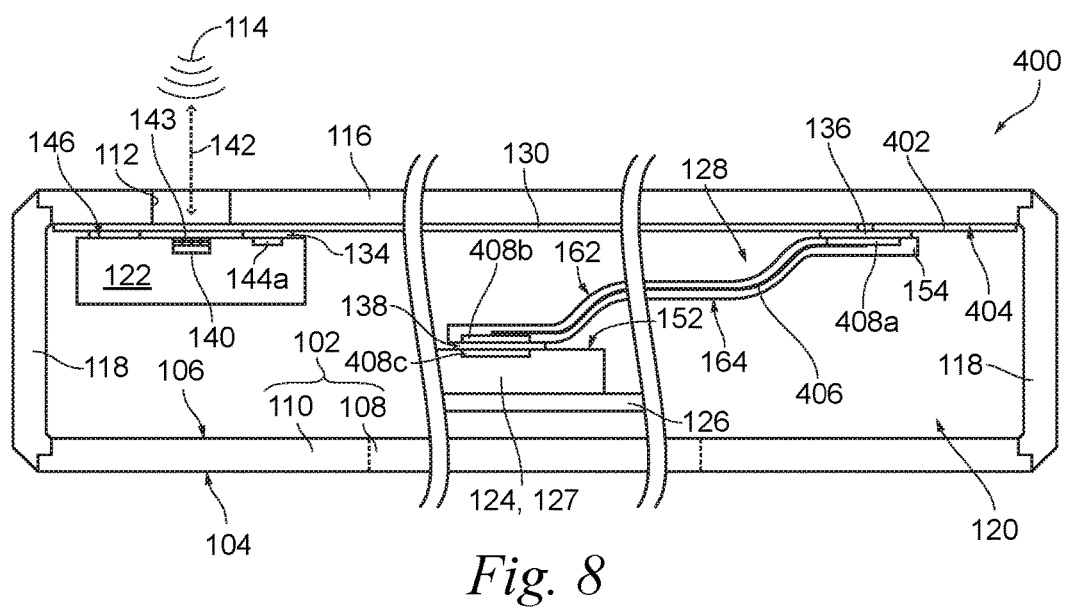
FIG. 8 is a cross-sectional view of the electronic device of FIG. 7 taken along the line 8-8 in FIG. 7.

FIG. 7 is a bottom plan view of an electronic device 400 in accordance with at least another embodiment of the present technology. FIG. 8 is a cross-sectional view of the electronic device 400 taken along the line 8-8 in FIG. 7. With reference to FIGS. 7 and 8 together, the acoustic transducer 122 and the transducer lead 130 of the electronic device 400 can be carried by the second covering substrate 116 rather than by the first covering substrate 102. The electronic device 400 can also include an antenna 402 configured for radiofrequency communication to and/or from the electronic device 400. Similar to the transducer lead 130, the antenna 402 can be carried by the second covering substrate 116. In at least some cases, the second covering substrate 116 is an opaque backing of the electronic device 400 that does not operate as a touch-sensitive display. The transducer lead 130 and the antenna 402 can each include one or more electrodes disposed (e.g., by plating, patterning, etc.) on an inner surface 404 of the second covering substrate 116. These electrodes can be coplanar and well suited for forming electrical interconnections via anisotropic conductive adhesive or solder without the need for specially shaped contacts.

The acoustic transducer 122 and the antenna 402 can be electrically connected to the processing circuitry 124 via one or more shared electrodes. For example, the electronic device 400 can include a shared electrode 406 carried by the second circuit board 128, and contacts 408a-408c through which the electrode 406 is electrically connected to the acoustic transducer 122, the antenna 402, and the processing circuitry 124. The processing circuitry 124 can be configured to decode signals from the acoustic transducer 122 and the antenna 402 received via the electrode 406. Similarly, the electronic devices 100, 200, 300 (FIGS. 1-6) can include one or more electrodes 406 shared by the corresponding acoustic transducers 122 and touch sensors 132. These shared electrodes can be present in addition to or instead of separate electrodes within the arrays of electrodes 156. In these cases, the corresponding processing circuitry 124 can be configured to decode signals from the acoustic transducers 122 and the touch sensors 132. Furthermore, it should be understood that the electronic device 400 can include separate electrodes for the acoustic transducer 122 and the antenna 402, respectively, in addition to or instead of the shared electrode 406.

In still other embodiments, combinations of components other than an acoustic transducer and a touch sensor or an acoustic transducer an antenna can be electrically connected to a processor via independent or shared electrodes carried by a covering substrate. For example, a covering substrate can carry electrodes through which a processor communicates in one or two directions with two or more acoustic transducers, with two or more antennas, with an acoustic transducer and a fingerprint sensor, with a touch sensor and a fingerprint sensor, or with any of numerous other suitable permutations of electrical components. In these and other embodiments, one or more of the components can be selected from the group consisting of front-facing ear speakers, fingerprint sensors, pressure sensors, antenna modules, and hall effect sensors. With respect to at least some of these components (e.g., at least some fingerprint sensors, antenna modules, and hall effect sensors), there may be little or no need for an associated acoustic port or for an associated acoustically transparent cover.

This disclosure is not intended to be exhaustive or to limit the present technology to the precise forms disclosed herein. Although specific embodiments are disclosed herein for illustrative purposes, various equivalent modifications are possible without deviating from the present technology, as those of ordinary skill in the relevant art will recognize. In some cases, well-known structures and functions have not been shown and/or described in detail to avoid unnecessarily obscuring the description of the embodiments of the present technology. Although steps of methods may be presented herein in a particular order, in alternative embodiments the steps may have another suitable order. Similarly, certain aspects of the present technology disclosed in the context of particular embodiments may be combined or eliminated in other embodiments. Furthermore, while advantages associated with certain embodiments may have been disclosed in the context of those embodiments, other embodiments may also exhibit such advantages, and not all embodiments need necessarily exhibit such advantages or other advantages disclosed herein to fall within the scope of the present technology.

Throughout this disclosure, the singular terms "a," "an," and "the" include plural referents unless the context clearly indicates otherwise. Similarly, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Additionally, the terms "comprising" and the like, as used throughout this disclosure, mean including at least the recited feature(s) such that any greater number of the same feature(s) and/or one or more additional types of features are not precluded. Directional terms, such as "upper," "lower," "front," "back," "vertical," and "horizontal," may be used herein to express and clarify the relationship between various elements. It should be understood that such terms do not denote absolute orientation. Reference herein to "one embodiment," "an embodiment," or similar formulations means that a particular feature, structure, operation, or characteristic described in connection with the embodiment can be included in at least one embodiment of the present technology. Thus, the appearances of such phrases or formulations herein are not necessarily all referring to the same embodiment. Furthermore, various particular features, structures, operations, or characteristics may be combined in any suitable manner in one or more embodiments of the present technology.

We claim:

1. An electronic device, comprising:
a covering substrate having an outer major surface and an inner major surface;
an acoustic port extending through the covering substrate between the outer and inner major surfaces of the covering substrate;
an acoustic transducer rigidly connected to and carried by the inner major surface of the covering substrate, wherein an acoustic path extends between an exterior of the device and the transducer via the acoustic port;
a touch sensor carried by the covering substrate;
a transducer lead carried by the covering substrate, wherein the transducer lead is electrically connected to the transducer;
processing circuitry operably associated with the touch sensor and with the transducer; and
an array of electrodes through which the touch sensor and the transducer lead are electrically connected to the processing circuitry, wherein the transducer lead extends between the acoustic transducer and a flexible interconnect at a contact region, the flexible interconnect carrying the array of electrodes that is connected to the touch sensor and the transducer lead at the contact region.

2. The electronic device of claim 1, wherein the transducer lead and a connection portion of the touch sensor are located proximal to the contact region.

3. The electronic device of claim 1, wherein the acoustic port is a first acoustic port and the transducer includes a second acoustic port aligned with the first acoustic port, the second acoustic port containing an acoustically transparent cover.

4. The electronic device of claim 1 wherein the touch sensor and the transducer lead are embedded within the covering substrate.

5. The electronic device of claim 1, further comprising a film extending along the inner major surface of the covering substrate, wherein the touch sensor and the transducer lead are embedded within the film.

6. The electronic device of claim 1 wherein the touch sensor and the transducer lead are coplanar.

7. The electronic device of claim 1 wherein the transducer is a microphone.

8. The electronic device of claim 1 wherein the transducer is a speaker.

9. The electronic device of claim 1, further comprising a conductive coupler disposed between the transducer and the inner major surface of the covering substrate, wherein the transducer is rigidly connected to the covering substrate via the conductive coupler, and wherein the transducer is electrically connected to the transducer lead via the conductive coupler.

10. The electronic device of claim 9 wherein the conductive coupler includes an anisotropic conductive adhesive.

11. The electronic device of claim 9 wherein the acoustic port is a first acoustic port, wherein the transducer includes a second acoustic port aligned with the first acoustic port, and wherein the conductive coupler extends around the acoustic path in a plane parallel to the inner major surface of the covering substrate.

12. The electronic device of claim 9 wherein the acoustic port is a first acoustic port, wherein the transducer includes a second acoustic port laterally offset from the first acoustic port in a plane parallel to the inner major surface of the covering substrate, wherein the conductive coupler is at a first side of the transducer, and wherein the second acoustic port is at an opposite second side of the transducer.

13. The electronic device of claim 9, further comprising a film extending along the inner major surface of the covering substrate, wherein the touch sensor and the transducer lead are embedded within the film, and wherein the conductive coupler is disposed between the transducer and the film.

14. An electronic device, comprising:
a covering substrate having an outer major surface and an inner major surface;
an acoustic port extending through the covering substrate between the outer and inner major surfaces of the covering substrate;
an acoustic transducer rigidly connected to and carried by the inner major surface of the covering substrate, wherein an acoustic path extends between an exterior of the device and the transducer via the acoustic port;
an antenna carried by the covering substrate;
a transducer lead carried by the covering substrate, wherein the transducer lead is electrically connected to the transducer;
processing circuitry operably associated with the antenna and with the transducer; and
an electrode through which the antenna and the transducer lead are electrically connected to the processing circuitry, wherein the transducer lead extends between the acoustic transducer and a flexible interconnect at a contact region, the flexible interconnect carrying the electrode that is connected to the antenna and the transducer lead at the contact region.

15. The electronic device of claim 14, wherein the transducer lead and a connection portion of the antenna are located proximal to the contact region.

16. The electronic device of claim 14 wherein the acoustic port is a first acoustic port and the transducer includes a second acoustic port aligned with the first acoustic port, the second acoustic port containing an acoustically transparent cover.

17. The electronic device of claim 14 wherein the antenna and the transducer lead are coplanar.

18. An electronic device, comprising:
a covering substrate having an outer major surface and an inner major surface;
an acoustic port extending through the covering substrate between the outer and inner major surfaces of the covering substrate;
an acoustic transducer rigidly connected to and carried by the inner major surface of the covering substrate, wherein an acoustic path extends between an exterior of the device and the transducer via the acoustic port;
at least one of a touch sensor and an antenna carried by the covering substrate;
a first circuit board spaced apart from the covering substrate; and
a second circuit board through which the transducer and the at least one of the touch sensor and the antenna are electrically connected to the first circuit board, and wherein the second circuit board is more flexible than the first circuit board, the second circuit board connected to the at least one of the touch sensor and the antenna at an electrical interconnect at a contact region spaced apart from the acoustic transducer.

19. The electronic device of claim 18, further comprising:
a transducer lead through which the transducer is electrically connected to the second circuit board; and
a film extending along the inner major surface of the covering substrate, wherein the touch sensor and the transducer lead are embedded within the film.

20. The electronic device of claim 19, further comprising a conductive coupler disposed between the transducer and the film, wherein the transducer is rigidly connected to the covering substrate via the conductive coupler, and wherein the transducer is electrically connected to the transducer lead via the conductive coupler.

* * * * *